(12) United States Patent
Binet et al.

(10) Patent No.: US 11,335,141 B2
(45) Date of Patent: May 17, 2022

(54) CHECKPOINT-BASED TRACING FOR MONITORING A ROBOTIC SYSTEM

(71) Applicant: Argo AI, LLC, Pittsburgh, PA (US)

(72) Inventors: Guillaume Binet, Pittsburgh, PA (US); Nicholas J. Meyer, Pittsburgh, PA (US); Randall Nortman, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 442 days.

(21) Appl. No.: 16/660,133

(22) Filed: Oct. 22, 2019

(65) Prior Publication Data

US 2021/0118251 A1 Apr. 22, 2021

(51) Int. Cl.
| | |
|---|---|
| G01M 17/00 | (2006.01) |
| G06F 7/00 | (2006.01) |
| G06F 19/00 | (2018.01) |
| G07C 5/08 | (2006.01) |
| G05D 1/00 | (2006.01) |
| G05D 1/02 | (2020.01) |
| G05B 23/02 | (2006.01) |

(52) U.S. Cl.
CPC ....... *G07C 5/0841* (2013.01); *G05B 23/0264* (2013.01); *G05D 1/0088* (2013.01); *G05D 1/0246* (2013.01)

(58) Field of Classification Search
CPC .............. G07C 5/0841; G05B 23/0264; G05D 1/0088; G05D 1/0246
USPC ...................................................... 701/33.4
See application file for complete search history.

(56) References Cited

U.S. PATENT DOCUMENTS

| | | |
|---|---|---|
| 7,849,450 B1 | 12/2010 | Rydh et al. |
| 7,937,618 B2 | 5/2011 | Dorai et al. |
| 8,261,130 B2 | 9/2012 | Mayer et al. |
| 8,291,383 B1 | 10/2012 | Evans |
| 10,073,760 B2 | 9/2018 | Golender et al. |
| 2017/0213167 A1 | 7/2017 | Rinke et al. |
| 2018/0237027 A1 | 8/2018 | Lundsgaard |
| 2018/0321356 A1 | 11/2018 | Kulkarni et al. |
| 2019/0004530 A1 | 1/2019 | Tascione et al. |
| 2020/0304523 A1* | 9/2020 | Yadav ................ H04L 43/0894 |
| 2020/0379454 A1* | 12/2020 | Trinh ................... G05B 23/024 |
| 2021/0190641 A1* | 6/2021 | Oostendorp ........ G01M 99/005 |
| 2022/0006821 A1* | 1/2022 | Koyama ............. H04L 63/1416 |

FOREIGN PATENT DOCUMENTS

KR 20170088057 A 8/2017

* cited by examiner

*Primary Examiner* — Mahmoud S Ismail
(74) *Attorney, Agent, or Firm* — Fox Rothschild LLP

(57) ABSTRACT

To identify sources of data resulting from an execution flow in a robotic device such as an autonomous vehicle, an operating system receives sensor data from various sensors of the robotic device. For each sensor, the system generates a data log comprising an identifier of a first checkpoint associated with that sensor, as well as a first timestamp. The system performs an execution flow on the sensor data from that sensor. The system updates the data log to include an identifier and timestamp for one or more additional checkpoints during the execution flow. The system then fuses results, uses the fused data as an input for a decision process, and causes a component of the robotic device to take an action in response to an output of the decision process. The system may record the action, an action timestamp and the data logs for each sensor in a memory.

20 Claims, 3 Drawing Sheets

CHECKPOINT-BASED TRACING FOR MONITORING A ROBOTIC SYSTEM

BACKGROUND

In robotic systems such as autonomous vehicles, it is important to be able to retrace events that happened in the system, so that the system can identify and compare differences between expected behavior and what actually executed in a real-world environment. This is especially important when training a system, as such differences can happen more frequently in a training process. It is also important for fault diagnosis and resolution.

The act of retracing events can be a challenge in complex systems such as vehicles, as complex systems receive and process a large volume of data points per second. Sometimes processes running on a complex system may skip a step and/or ignore certain data when processing to avoid falling behind real-time processing requirements. While this ensures that the system's processing remains current, it creates a challenge for analysis and training, as it can lead to uncertainty as to which data the system actually used to make its decisions.

This document describes processes and systems that are directed to addressing the issues described above, and/or other issues.

SUMMARY

This document describes various methods and systems for analyzing program execution to identify sources of data resulting from an execution flow in an autonomous vehicle or other robotic device. To do this, an operating system includes processor and programming instructions. The processor is communicatively connected to various sensors and components of the vehicle or other robotic device. When the system receives sensor data from the sensors, then for each sensor the system will generate a data log comprising an identifier of a first checkpoint associated with that sensor, as well as a first timestamp. The system will perform an execution flow (i.e., one or more processes) on the sensor data from that sensor. The system will update the data log to include an identifier and timestamp for one or more additional checkpoints during the execution flow. The system may then fuse results from each execution flow to yield fused data, use the fused data as an input for a decision process, and cause a component of the robotic device to take an action in response to an output of the decision process. An example of such an action is to operate in a safe mode. The system also may record the action, an action timestamp and the data logs for each sensor in a memory.

In some embodiments, for any sensor the system may determine a difference between the action timestamp and the first timestamp for that sensor exceeds a threshold. For any sensor whose difference exceeds the threshold, the system may use the data log for that sensor to trace the execution flow for that sensor and identify a cause of latency in that execution flow.

In some embodiments, rather than always updating the data log for each sensor to include an identifier and timestamp for one or more additional checkpoints during the execution flow, in some embodiment the system may do so only for checkpoints that are associated with processes that may affect the latency in that execution flow.

In some embodiments, when performing the execution flow and updating the data log for each sensor the system may, at each of a plurality of checkpoints in the execution flow, update the data log and pass the data log along to a next checkpoint in the execution flow without retaining a copy of the data log.

In some embodiments, prior to recording the action timestamp, the system may determine an estimated action timestamp for a corresponding action. The system also may determine whether the corresponding action occurred at a time of the estimated action timestamp. If the corresponding action did not occur at the estimated action timestamp, the system may cause the robotic device to take a corrective action.

In some embodiments, fusing the results from each execution flow to yield the fused sensor data may include storing one or more identifying elements for two or more of the checkpoints in the execution flow. The identifying elements may include an identifier of the first checkpoint, along with a timestamp for one or more data elements that flowed from the first checkpoint. In addition or alternatively, the identifying elements may include timestamps for data that flowed from checkpoints that are ancestor checkpoints to the first checkpoint in the execution flow.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." In this document, when relative terms of order such as "first" and "second" are used to modify a noun, such use is simply intended to distinguish one item from another, and is not intended to require a sequential order unless specifically stated.

Other terms that are relevant to this disclosure will be defined at the end of this detailed description.

Figure 1:
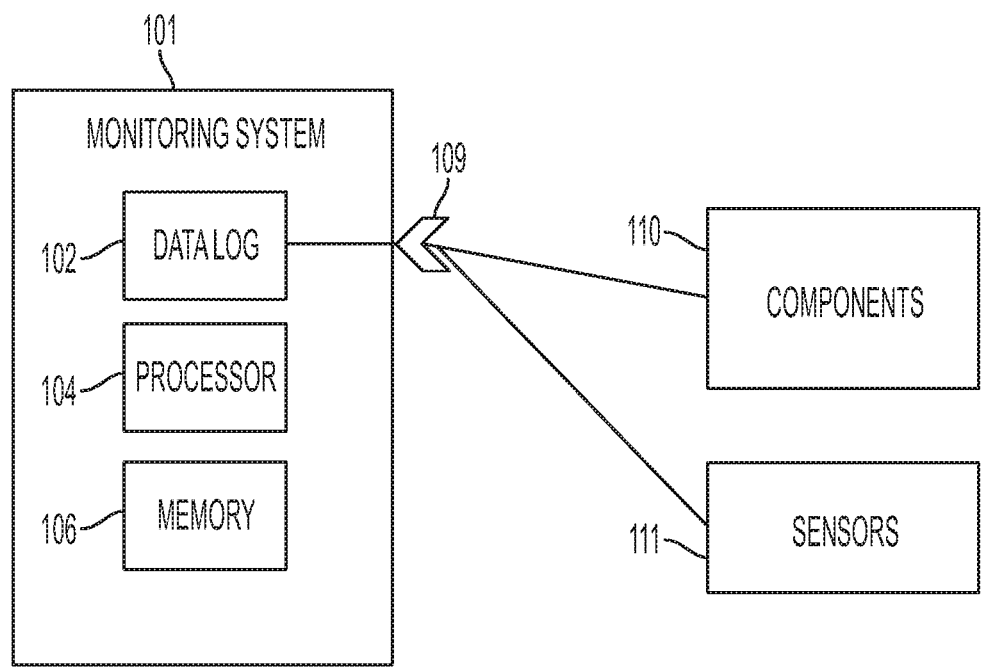
FIG. 1 illustrates example components of an automated device monitoring system.

An automated device monitoring system is a set of hardware that is communicatively and/or electrically connected to various components (such as sensors) of an automated device to collect status or operational parameter values from those components. As illustrated in FIG. 1, an automated device monitoring system 101 may include or be connected to a data logging device 102 that includes a data input 109 (such as a wireless receiver) that is configured to receive device operation data directly or indirectly from the device's components 110 and sensors 111. The monitoring system 101 also may include a processor 104 and a memory 106 with programming instructions. A monitoring system may include a transmitter for transmitting commands and/or data to external electronic devices and/or remote servers. In various embodiments, a monitoring system may be embedded or integral with the automated device's other components, or it may be a separate device that is in communication with one or more other local systems, such as, for example in the context of an autonomous vehicle (AV), and on-board diagnostics system. Example systems and sensors of an AV will be discussed below in the context of FIG. 3.

Figure 2:
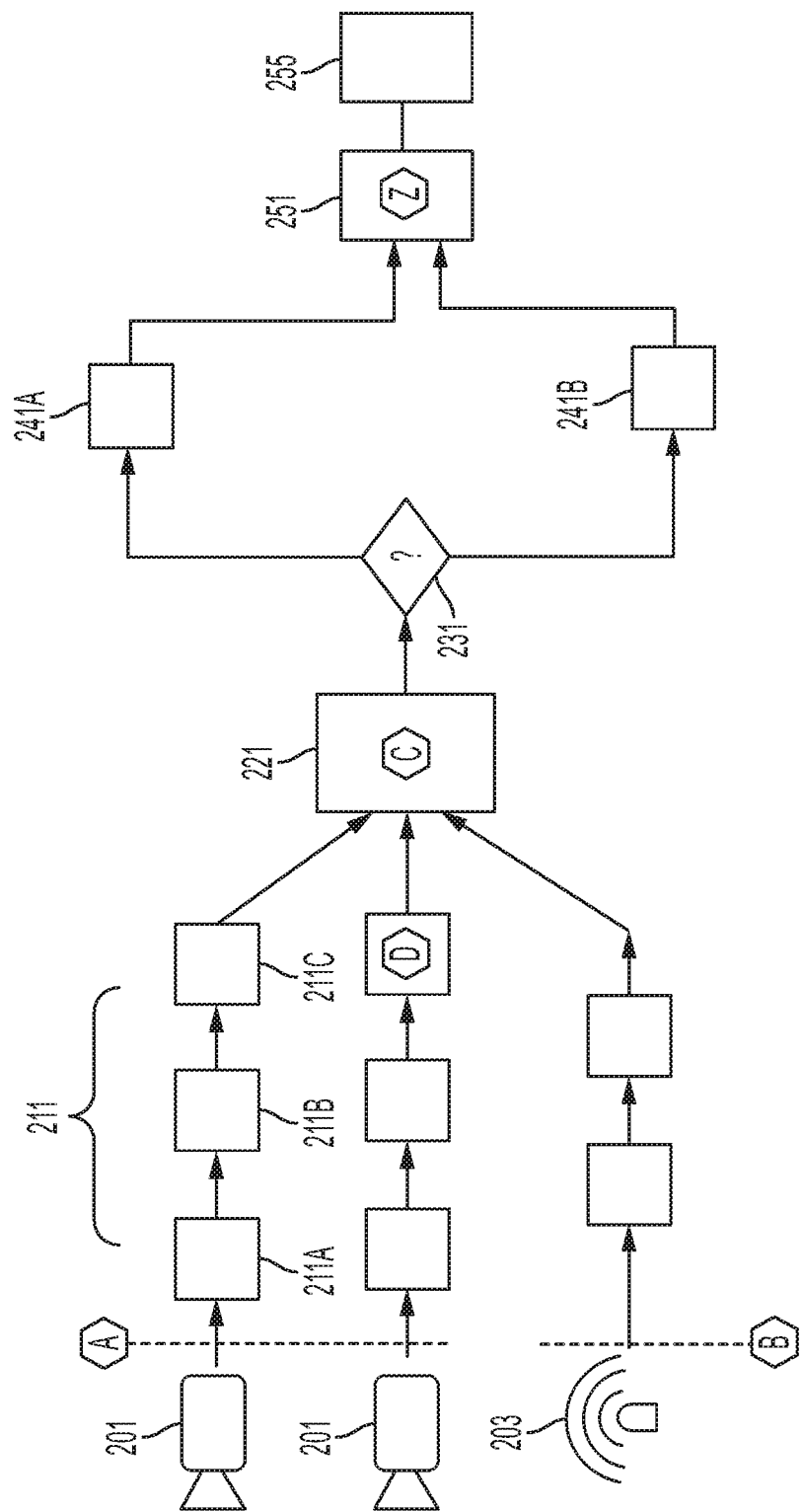
FIG. 2 illustrates example elements of a robotic device such as an autonomous vehicle and an execution flow that may be applied to data received from those elements.

FIG. 2 illustrates example elements of a robotic device such as an AV, along with an execution flow that may be applied to data received from those elements. Using the vehicle as an example, the vehicle's operating system will receive sensed data from a variety of sensors such as cameras 201, 202 and LiDAR system 203, as well as from other components of the vehicle.

For each sensor, the system will generate a data log that includes an identifier of a first checkpoint associated with that sensor. For example, in FIG. 2 sensors that include cameras 201 and 202 are associated with checkpoint A, and a LiDAR system 203 is associated with checkpoint B. The data log for each sensor also will include a timestamp at which the data associated with the sensor was collected and/or passed through the checkpoint.

For each sensor, the system will then perform an execution flow 211 that includes one or more processes (e.g., 211A-211C) on the sensor data for that sensor. The term "execution flow" refers to a sequence of functions that are to be performed in a particular order, and is further defined near the end of this Detailed Description. Any step in an execution flow also may be associated with a checkpoint (example: D in FIG. 2). The system will update the data log to include an identifier and time stamp for one or more additional checkpoints during the execution flow. The system may pass the data log to each checkpoint in the execution flow. Each checkpoint may update the data log and pass it along to the next checkpoint without retaining a copy of the data log, this reducing data storage requirements and facilitating real-time, live data logging.

The system will perform a data fusion process 221 that fuses results from each execution flow, yielding a set of fused data. The data fusion process 221 also may be considered to be a checkpoint C in the execution flow. To create the fused data, the system may combine one or more identifying elements for two or more of the checkpoints in the execution flow, and it may store those identifying elements as fused data. For example, to create fused data at any particular checkpoint, the system may store an identifier of each direct parent checkpoint (or other direct parent node) in the execution flow, along with a timestamp for one or more data elements that flowed from the parent(s), and optionally timestamps for data that flowed from earlier ancestor checkpoints to the parent checkpoint(s). Notably, while the results of each execution flow also may be stored, that is not necessarily a requirement of this data fusion process. Instead, the fused data includes elements indicating the checkpoint(s) from which the data was derived, along with timestamp(s) of data that yielded the result.

The system will then use the fused data from various execution flows as an input for a decision process 231. The system will cause one or more components of the robotic device (e.g., 241A or 241B) to take an action in response to an output of the decision process. For example, in an AV the system may use data from the vehicle's camera, LiDAR and global positioning system (GPS) sensors to determine whether to move forward into an intersection by assessing whether an obstacle such as another vehicle, bicycle or person is approaching the intersection from the intersecting lane, and only proceed forward if the AV can pass through the intersection before the obstacle will reach the intersection or after the obstacle will pass through the intersection. As another example, the system may select a speed of travel for the AV by accessing posted speed limits (from map data and/or speed limit signs detected by cameras), using camera and/or LiDAR data to sensing speed of another vehicle moving in front of the AV in the same lane as the AV, and select the speed to be either the speed of the other vehicle or the speed limit, whichever is lower.

After the system takes an action, the system will record the action, an action timestamp and the data logs for each sensor in a memory.

The system will then perform a process 251 that determines whether, for any sensor, a difference between the action timestamp and the first timestamp for that sensor exceeds a threshold. If the difference for one or more sensors exceeds the applicable threshold (indicating that latency is occurring in the execution flow), the system may cause operation of one or more subsystems of the robotic device to operate in a safe mode 255. A safe mode may include restrictions on one or more parameters (such as a speed limit) and/or operational requirements (such as come to a stop at the next safe location, or require manual operation of the vehicle). Optionally, for any sensor whose difference exceeds the threshold, the system may use the data log for that sensor to trace the execution flow for that sensor and identify a cause of latency in that execution flow. To trade the execution flow, the system may start from the closet downstream checkpoint and measure latency between that checkpoint and its parent by calculating a difference between timestamps for the two checkpoints. The system may then use this to measure latency between the parent and its upstream parent (i.e., grandparent), and so on until a checkpoint that caused the latency is found. The system may determine that a checkpoint caused latency of its latency exceeds a threshold, it greater (or at least a threshold amount greater_) than other checkpoints' latencies, or if it represents the highest contributor to overall latency in the execution flow. This process may be done by the robotic device's on-board computing system, or the system may transfer the data log to a remote server for off-board analysis and diagnosis.

Figure 3:
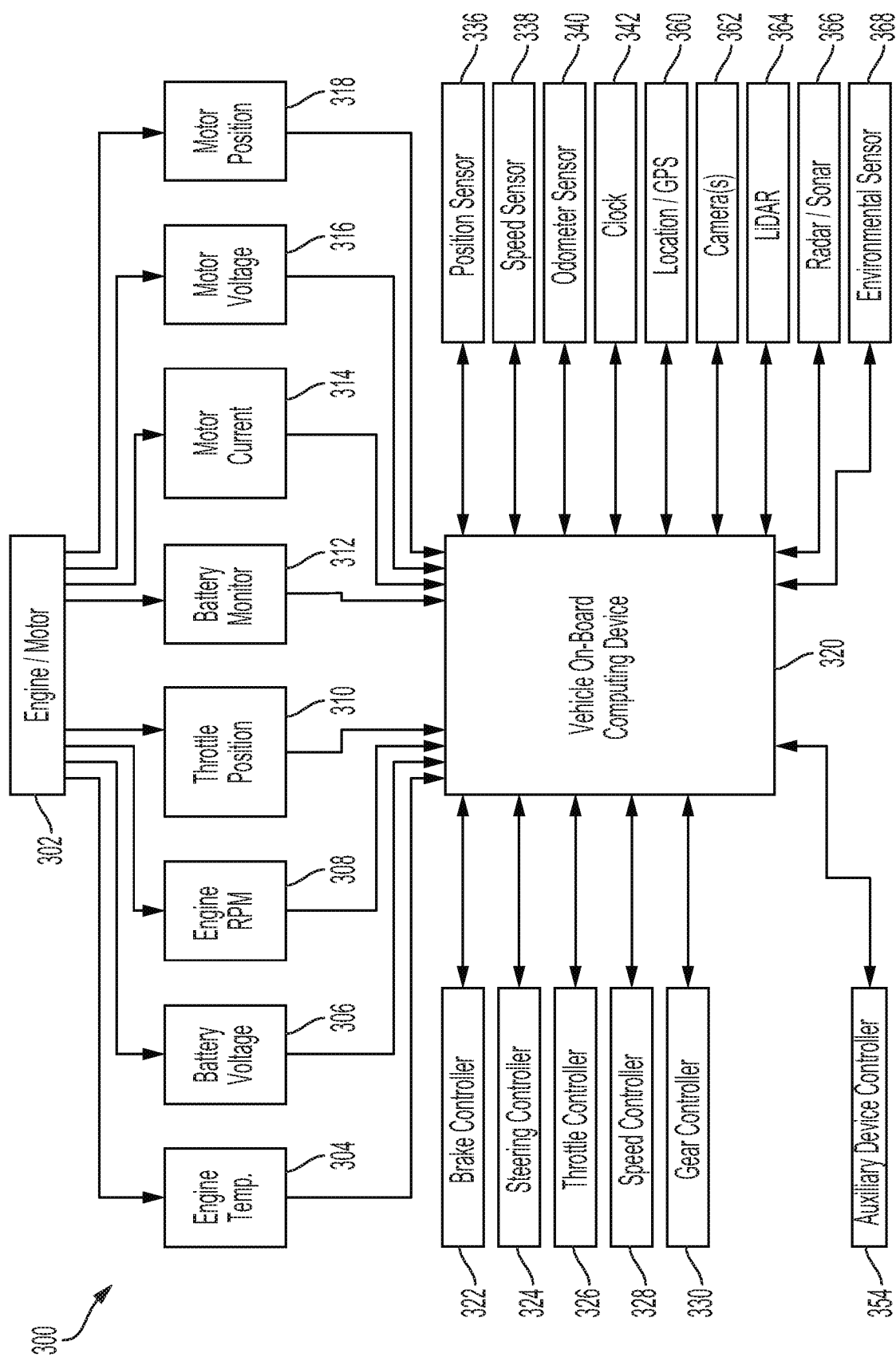
FIG. 3 illustrates example components of a robotic device such as an autonomous vehicle.

FIG. 3 illustrates an example system architecture for a particular robotic device, in this case an autonomous vehicle (AV) 300. A system architecture such as that shown in FIG. 3 may be used with the monitoring system 101 of FIG. 1.

As shown in FIG. 3, the vehicle includes an engine or motor 302 and various sensors 304-318 for measuring various parameters of the vehicle. In gas-powered or hybrid vehicles having a fuel-powered engine, the sensors may include, for example, an engine temperature sensor 304, a battery voltage sensor 306, an engine rotations per minute (RPM) sensor 308, and a throttle position sensor 310. If the vehicle is an electric or hybrid vehicle, then the vehicle may have an electric motor, and accordingly will have sensors such as a battery monitoring system 312 (to measure current, voltage and/or temperature of the battery), motor current 314 and temperature 316 sensors, and motor position sensors such as resolvers and encoders 318.

Operational parameter sensors that are common to both types of vehicles include, for example: a position sensor 336 such as an accelerometer, gyroscope and/or inertial measurement unit; a speed sensor 338; and an odometer sensor 340. The vehicle also may have a clock 242 that the system uses to determine vehicle time during operation. The clock 342 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 360 (e.g., a GPS device); object detection sensors such as one or more cameras 362; a LiDAR sensor system 364; and/or a radar and or and/or a sonar system 366. The sensors also may include environmental sensors 368 such as a precipitation sensor and/or ambient temperature sensor. The object detection sensors may enable the vehicle to detect objects that are within a given distance range of the vehicle 300 in any direction, while the environmental sensors collect data about environmental conditions within the vehicle's area of travel.

During operations, information is communicated from the sensors to an on-board computing device 320. The on-board computing device 320 analyzes the data captured by the sensors and optionally controls operations of the vehicle based on results of the analysis. For example, the on-board computing device 320 may control braking via a brake controller 322; direction via a steering controller 324; speed and acceleration via a throttle controller 326 (in a gas-powered vehicle) or a motor speed controller 328 (such as a current level controller in an electric vehicle); a differential gear controller 330 (in vehicles with transmissions); and/or other controllers.

Geographic location information may be communicated from the location sensor 360 to the on-board computing device 320, which may then access a map of the environment that corresponds to the location information to determine known fixed features of the environment such as streets, buildings, stop signs and/or stop/go signals. Captured images from the cameras 362 and/or object detection information captured from sensors such as LiDAR system 364 is communicated from those sensors) to the on-board computing device 320. The object detection information and/or captured images are processed by the on-board computing device 320 to detect objects in proximity to the vehicle 300. Any known or to be known technique for making an object detection based on sensor data and/or captured images can be used in the embodiments disclosed in this document Terminology that is relevant to the disclosure provided above and in the claims includes:

The terms "automated device," "autonomous device" or "robotic device" refer to an electronic device that includes a processor, locally or remotely stored programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "execution flow" refers to a sequence of functions that are to be performed in a particular order. A function refers to one or more operational instructions that cause a system to perform one or more actions. In various embodiments, an execution flow may pertain to the operation of an automated device. For example, with respect to an autonomous vehicle, a particular execution flow may be executed by the vehicle in a certain situation such as, for example, when the vehicle is stopped at a red stop light that has just turned green. For instance, this execution flow may include the functions of determining that the light is green, determining whether there are any obstacles in front of or in proximity to the vehicle and, only if the light is green and no obstacles exist, accelerating. When a subsystem of an automated device fails to perform a function in an execution flow, or when it performs a function out of order in sequence, the error may indicate that a fault has occurred or that another issue exists with respect to the execution flow. Failing to perform a function in an execution flow, or performing a function out of order in sequence may indicate that a fault has occurred or that another issue exists with respect to the execution flow.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "automated device monitoring system" is a set of hardware that is communicatively and/or electrically connected to various components (such as sensors) of an automated device to collect status or operational parameter values from those components. An automated device monitoring system may include or be connected to a data logging device that includes a data input (such as a wireless receiver) that is configured to receive device operation data directly or indirectly from the device's components. The monitoring system also may include a processor, a transmitter and a memory with programming instructions. A monitoring system may include a transmitter for transmitting commands and/or data to external electronic devices and/or remote servers. In various embodiments, a monitoring system may be embedded or integral with the automated device's other computing system components, or it may be a separate device that is in communication with one or more other local systems, such as, for example in the context of an autonomous vehicle, an on-board diagnostics system.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A method of analyzing program execution in a robotic device, the method comprising:
by an operating system comprising processor and that is communicatively connected to a plurality of sensors and a plurality of components of a robotic device:
receiving sensor data from the plurality of sensors of the robotic device;
for each sensor:
generating a data log comprising an identifier of a first checkpoint associated with that sensor and a first timestamp,
performing an execution flow comprising one or more processes on the sensor data from that sensor, and
updating the data log to include an identifier and time stamp for one or more additional checkpoints during the execution flow,
fusing results from each execution flow to yield fused data;
using the fused data as an input for a decision process;
causing a component of the robotic device to take an action in response to an output of the decision process; and
recording the action, an action timestamp and the data logs for each sensor in a memory.

2. The method of claim 1, further comprising, by the operating system:
determining whether, for any sensor, a difference between the action timestamp and the first timestamp for that sensor exceeds a threshold; and
for any sensor whose difference exceeds the threshold, using the data log for that sensor to trace the execution flow for that sensor and identify a cause of latency in that execution flow.

3. The method of claim 1, wherein the action comprises causing the robotic device to operate in a safe mode.

4. The method of claim 1, wherein updating the data log for each sensor to include an identifier and timestamp for one or more additional checkpoints during the execution flow comprises doing so only for checkpoints that are associated with processes that may affect latency in that execution flow.

5. The method of claim 1, wherein performing the execution flow and updating the data log for each sensor comprises, at each of a plurality of checkpoints in the execution flow, updating the data log and passing the data log along to a next checkpoint in the execution flow without retaining a copy of the data log.

6. The method of claim 1 further comprising, by the operating system prior to recording the action timestamp, determining an estimated action timestamp for a corresponding action.

7. The method of claim 6 further comprising, by the operating system:
determining whether the corresponding action occurred at a time of the estimated action timestamp;
upon determining that the corresponding action did not occur at the estimated action timestamp, causing the robotic device to take a corrective action.

8. The method of claim 1, wherein fusing the results from each execution flow to yield the fused sensor data comprises storing one or more identifying elements for two or more of the checkpoints in the execution flow.

9. The method of claim 1, wherein fusing the results from each execution flow to yield the fused sensor data comprises, at one of the additional checkpoints, storing an identifier of the first checkpoint, along with a timestamp for one or more data elements that flowed from the first checkpoint.

10. The method of claim 1, wherein fusing the results from each execution flow to yield the fused sensor data further comprises storing timestamps for data that flowed from checkpoints that are ancestor checkpoints to the first checkpoint in the execution flow.

11. An automated device monitoring system comprising:
a processor;
a communication link between the processor and a plurality of sensors of a robotic device; and
a memory device containing programming instructions that are configured to cause the processor to:
receive, via the communication link, sensor data from the sensors of the robotic device,
for each sensor:
generate a data log comprising an identifier of a first checkpoint associated with that sensor and a first timestamp;
perform an execution flow comprising one or more processes on the sensor data from that sensor; and
update the data log to include an identifier and time stamp for one or more additional checkpoints during the execution flow,
fuse results from each execution flow to yield fused data,
use the fused data as an input for a decision process,
cause a component of the robotic device to take an action in response to an output of the decision process, and
record the action, an action timestamp and the data logs for each sensor in a data store.

12. The system of claim 11, further comprising additional programming instructions that are configured to cause the processor to:
determine whether, for any sensor, a difference between the action timestamp and the first timestamp for that sensor exceeds a threshold; and
for any sensor whose difference exceeds the threshold, use the data log for that sensor to trace the execution flow for that sensor and identify a cause of latency in that execution flow.

13. The system of claim 11, wherein the programming instructions to cause a component of the robotic device to take an action comprises instructions to cause the robotic device to operate in a safe mode.

14. The system of claim 11, wherein the programming instructions to update the data log for each sensor to include an identifier and timestamp for one or more additional checkpoints during the execution flow comprise instructions to do so only for checkpoints that are associated with processes that may affect latency in that execution flow.

15. The system of claim 11, wherein the programming instructions to perform the execution flow and update the data log for each sensor comprise instructions to, at each of a plurality of checkpoints in the execution flow, update the data log and pass the data log along to a next checkpoint in the execution flow without retaining a copy of the data log.

16. The system of claim 11 further comprising additional programming instructions that are configured to cause the processor to, prior to recording the action timestamp, determine an estimated action timestamp for a corresponding action.

17. The system of claim 16 further comprising additional programming instructions that are configured to cause the processor to:
determine whether the corresponding action occurred at a time of the estimated action timestamp; and
upon determining that the corresponding action did not occur at the estimated action timestamp, cause the robotic device to take a corrective action.

18. The system of claim 11, wherein the programming instructions to fuse the results from each execution flow to yield the fused sensor data comprise instructions to store one or more identifying elements for two or more of the checkpoints in the execution flow.

19. The system of claim 11, wherein the programming instructions to fuse the results from each execution flow to yield the fused sensor data comprise instructions to, at one of the additional checkpoints, store an identifier of the first checkpoint, along with a timestamp for one or more data elements that flowed from the first checkpoint.

20. The system of claim 11, wherein the programming instructions to fuse the results from each execution flow to yield the fused sensor data further comprise instructions to store timestamps for data that flowed from checkpoints that are ancestor checkpoints to the first checkpoint in the execution flow.

* * * * *